(12) United States Patent
Cheng (10) Patent No.: US 7,387,524 B2
(45) Date of Patent: Jun. 17, 2008

(54) QUICK RELEASE CONNECTOR THAT IS ASSEMBLED EASILY AND QUICKLY

(76) Inventor: Shih-Chung Cheng, 177, Lane 449, Sec. 2, Jhangcao Rd., Hemei Township, Changhua County (TW)

( * ) Notice: Subject to any disclaimer, the term of this patent is extended or adjusted under 35 U.S.C. 154(b) by 0 days.

(21) Appl. No.: 11/749,464

(22) Filed: May 16, 2007

(65) Prior Publication Data
US 2007/0275590 A1    Nov. 29, 2007

(30) Foreign Application Priority Data
May 25, 2006    (TW) .............................. 95209044 U (51) Int. Cl.
*H01R 13/627* (2006.01)
(52) U.S. Cl. ...................................... 439/352; 439/357
(58) Field of Classification Search ................ 439/352, 439/357, 350, 356; 285/319, 316
See application file for complete search history.

(56) References Cited
U.S. PATENT DOCUMENTS

| | | | | |
|---|---|---|---|---|
| 3,240,520 A | * | 3/1966 | Dailey et al. ............... | 403/325 |
| 4,747,656 A | * | 5/1988 | Miyahara et al. ............. | 385/75 |
| 4,810,017 A | * | 3/1989 | Knak et al. ............... | 294/82.27 |
| 4,836,580 A | * | 6/1989 | Farrell ......................... | 285/24 |
| 6,199,913 B1 | * | 3/2001 | Wang ........................... | 285/24 |
| 6,199,920 B1 | * | 3/2001 | Neustadtl ..................... | 285/322 |
| 6,467,816 B1 | * | 10/2002 | Huang ......................... | 285/316 |
| 7,140,645 B2 | * | 11/2006 | Cronley ........................ | 285/34 |

* cited by examiner

*Primary Examiner*—Neil Abrams
*Assistant Examiner*—Phuong Nguyen
(74) *Attorney, Agent, or Firm*—Alan Kamrath; Kamrath & Associates PA (57) ABSTRACT

A quick release connector includes a connector body, a positioning ring, a mounting sleeve, and an elastic member. The connector body has a peripheral wall formed with two opposite receiving holes and two opposite guide slots. The positioning ring is provided with a plurality of flexible locking blocks. Thus, the locking blocks are combined together by the positioning ring, so that the locking blocks of the positioning ring are placed into the receiving holes and the guide slots of the connector body easily and quickly, thereby simplifying the construction of the quick release connector, and thereby facilitating assembly and fabrication of the quick release connector.

19 Claims, 8 Drawing Sheets

QUICK RELEASE CONNECTOR THAT IS ASSEMBLED EASILY AND QUICKLY

BACKGROUND OF THE INVENTION

1. Field of the Invention

The present invention relates to a connector and, more particularly, to a quick release connector.

2. Description of the Related Art

Figure 6:
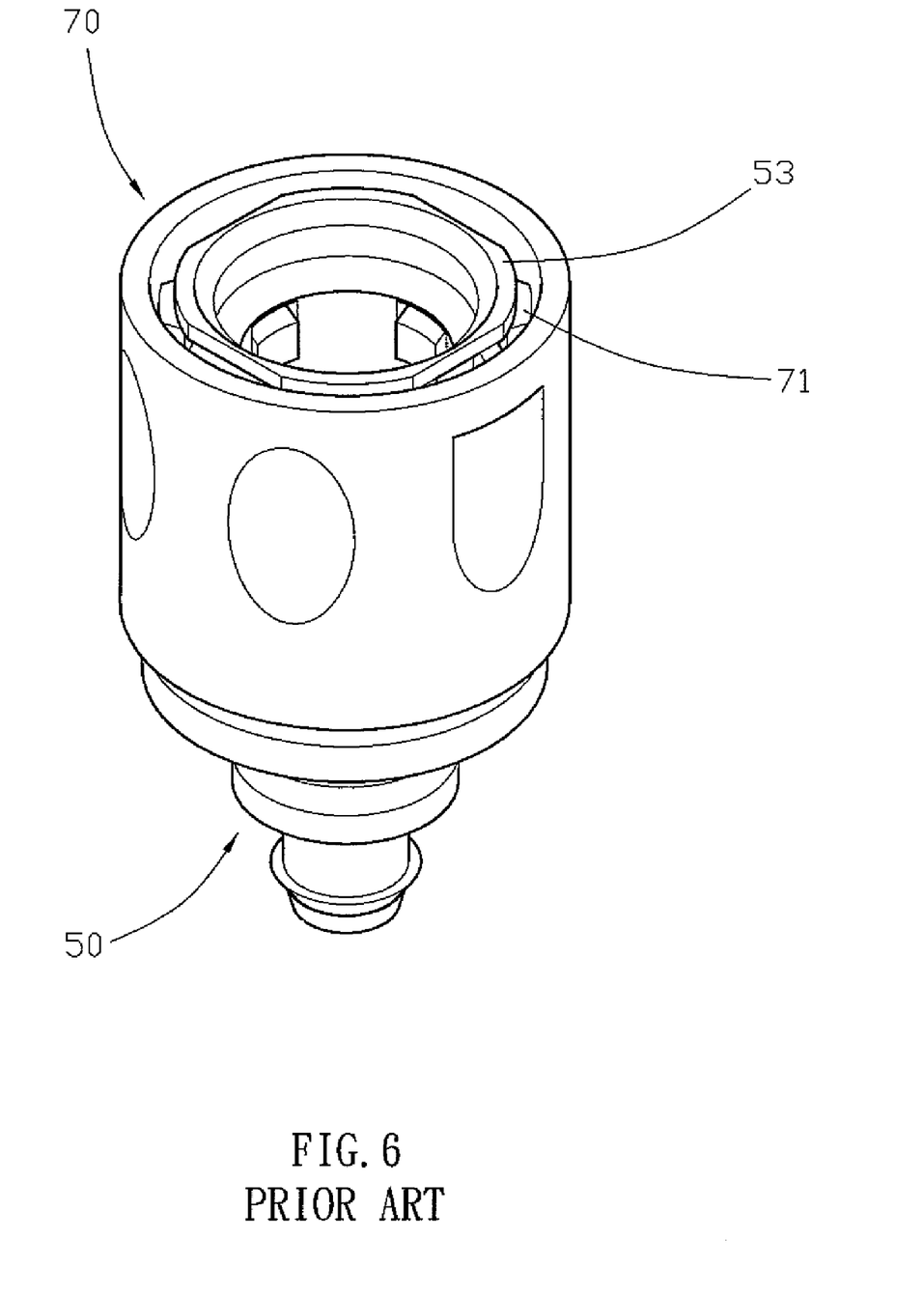
FIG. 6 is a perspective view of a conventional quick release connector in accordance with the prior art.
Figure 7:
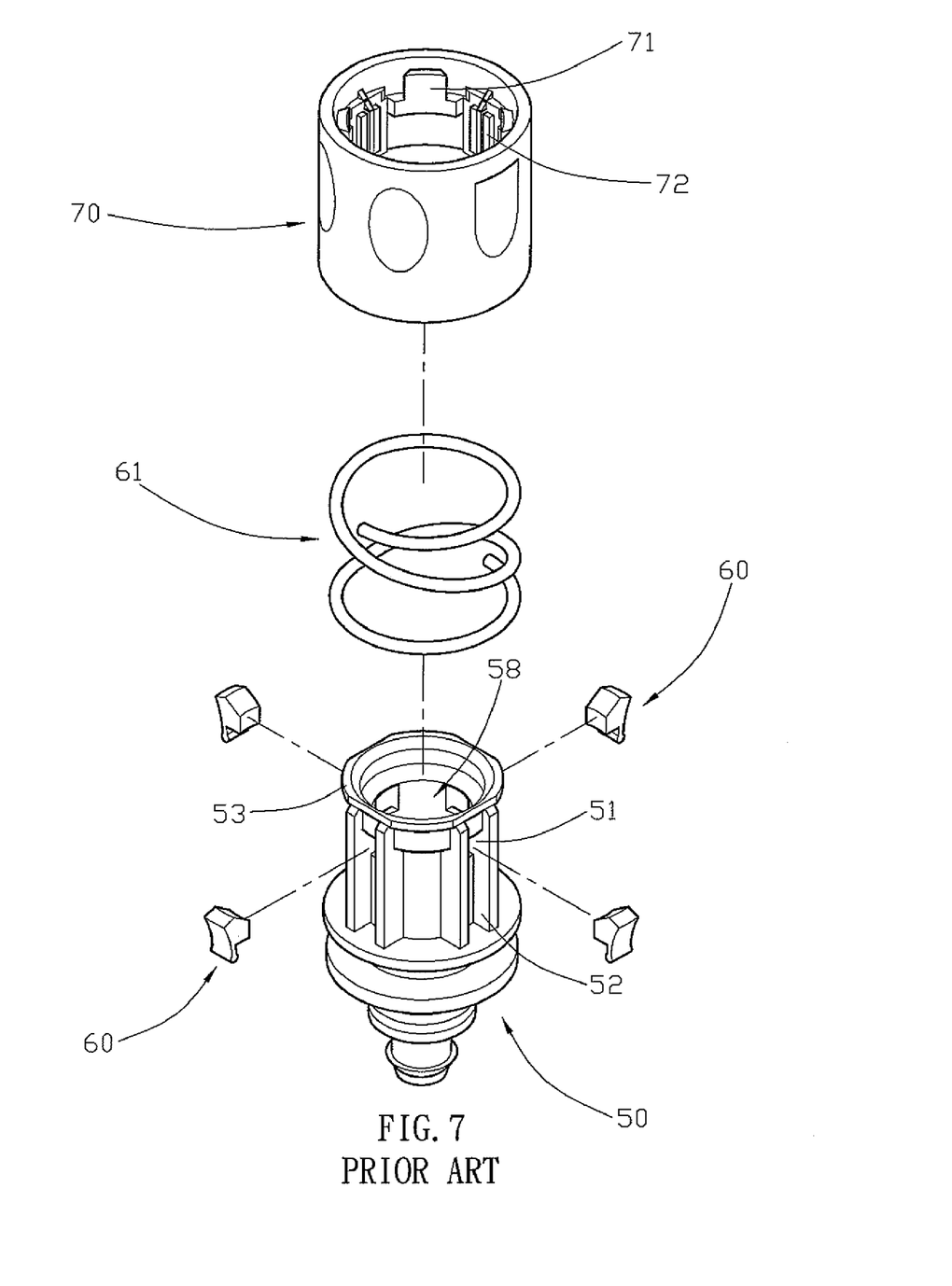
FIG. 7 is an exploded perspective view of the conventional quick release connector as shown in FIG. 6.
Figure 8:
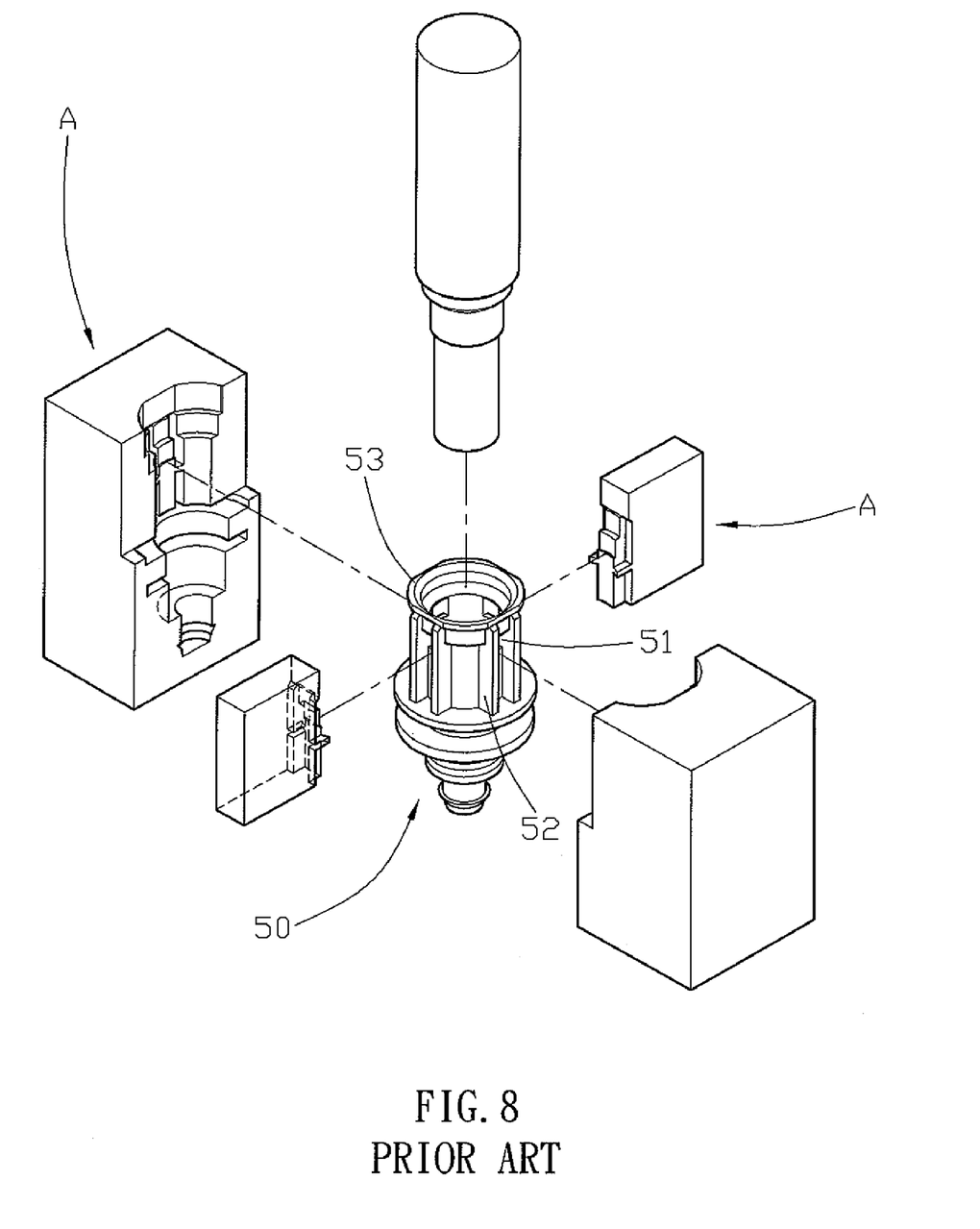
FIG. 8 is an exploded perspective view showing forming of the connector body of the conventional quick release connector as shown in FIG. 7.

A conventional quick release connector in accordance with the prior art shown in FIGS. 6-8 comprises a connector body 50 having an inside formed with a mounting chamber 58 and having a peripheral wall formed with four receiving holes 51 connected to the mounting chamber 58, four locking blocks 60 movably mounted in the receiving holes 51 of the connector body 50 and extendable into the mounting chamber 58 of the connector body 50, a mounting sleeve 70 movably mounted on the connector body 50 and having an inner wall provided with a plurality of push blocks 72 that are movable to push the locking blocks 60 into the mounting chamber 58 of the connector body 50, and an elastic member 61 mounted on the connector body 50 and biased between the connector body 50 and the mounting sleeve 70 to push the mounting sleeve 70 outwardly relative to the connector body 50 and to push the push blocks 72 to press the locking blocks 60. The connector body 50 has an end portion provided with a protruding limit flange 53. Each of the receiving holes 51 of the connector body 50 is provided with two catch walls 52. The inner wall of the mounting sleeve 70 is provided with a plurality of limit plates 71 that are movable to rest on the limit flange 53 of the connector body 50 to prevent the mounting sleeve 70 from being detached from the connector body 50.

In operation, when the mounting sleeve 70 is pressed toward the connector body 50, the elastic member 61 is compressed, and the push blocks 72 of the mounting sleeve 70 is movable to detach from the locking blocks 60, so that the locking blocks 60 are movable in the receiving holes 51 of the connector body 50. Thus, when an insert is inserted into the mounting chamber 58 of the connector body 50, the locking blocks 60 are extendable into an annular retaining groove of the insert. After the mounting sleeve 70 is released, the mounting sleeve 70 is pushed outwardly relative to the connector body 50 by the restoring force of the elastic member 61 so that the push blocks 72 of the mounting sleeve 70 are movable to press the locking blocks 60 into the retaining groove of the insert, so that the insert is locked onto the connector body 50 by the locking blocks 60.

However, it is necessary to place all of the locking blocks 60 into the receiving holes 51 of the connector body 50, so that the quick release connector cannot be assembled easily and quickly, thereby wasting time and increasing costs of assembly and fabrication of the quick release connector In addition, the catch walls 52 of each of the receiving holes 51 of the connector body 50 are formed by four slides "A" in a die during the molding process as shown in FIG. 8, so that the number of the slides "A" is increased, thereby increasing the costs of fabrication. Further, the connector body 50 is provided with four pairs of catch walls 52 so that the connector body 50 needs a relatively larger die removal space in the die, and the die only forms a few connector bodies 50 at a time, thereby decreasing the working efficiency, and thereby increasing the costs of fabrication.

BRIEF SUMMARY OF THE INVENTION

In accordance with the present invention, there is provided a quick release connector, comprising a connector body having an inside formed with a mounting chamber and having a peripheral wall formed with two opposite receiving holes connected to the mounting chamber and two opposite guide slots connected to the mounting chamber, a positioning ring mounted on the peripheral wall of the connector body and provided with a plurality of flexible locking blocks movably mounted in the receiving holes and the guide slots of the connector body and extendable into the mounting chamber of the connector body, a mounting sleeve movably mounted on the connector body and having an inner wall provided with a plurality of inwardly extending push blocks that are movable to press the locking blocks of the positioning ring to push the locking blocks of the positioning ring into the mounting chamber of the connector body, and an elastic member mounted on the connector body and biased between the connector body and the mounting sleeve to push the mounting sleeve outwardly relative to the connector body and to push the push blocks of the mounting sleeve to press the locking blocks of the positioning ring.

The primary objective of the present invention is to provide a quick release connector that is assembled easily and quickly.

Another objective of the present invention is to provide a quick release connector, wherein the locking blocks are combined together by limit of the positioning ring, so that the locking blocks of the positioning ring are placed into the receiving holes and the guide slots of the connector body easily and quickly, thereby simplifying the construction of the quick release connector, and thereby facilitating assembly and fabrication of the quick release connector.

A further objective of the present invention is to provide a quick release connector, wherein the catch walls are formed on two opposite sides of the connector body, and each of the guide slots of the connector body has a side formed with an oblique guide edge to facilitate removal of the connector body from the die, so that the number of the slides is decreased, thereby facilitating design of the die, and thereby decreasing the costs of fabrication for the die.

A further objective of the present invention is to provide a quick release connector, wherein the connector body is only provided with two pairs of catch walls so that the connector body needs a relatively smaller die removal space in the die, and the die can form more connector bodies at a time, thereby enhancing the working efficiency, and thereby decreasing the costs of fabrication.

Further benefits and advantages of the present invention will become apparent after a careful reading of the detailed description with appropriate reference to the accompanying drawings.

DETAILED DESCRIPTION OF THE INVENTION

Figure 1:
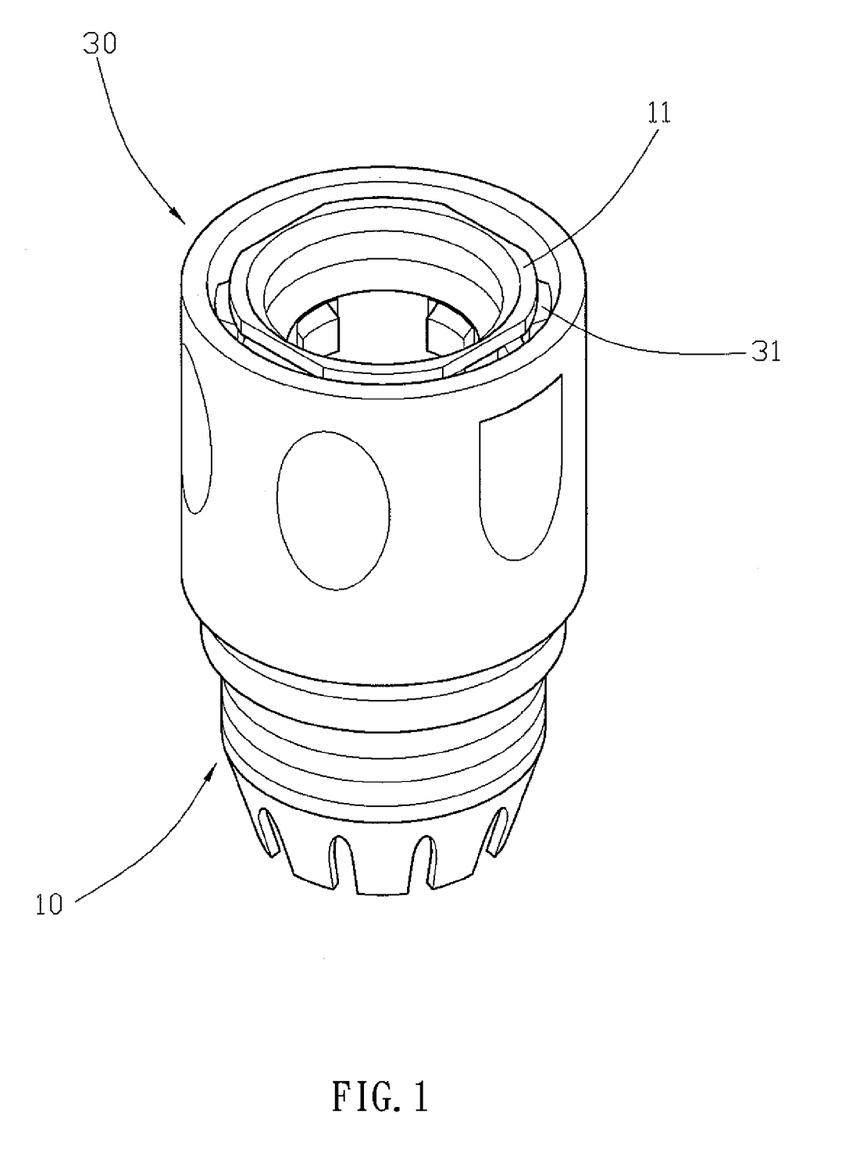
FIG. 1 is a perspective view of a quick release connector in accordance with the preferred embodiment of the present invention.
Figure 2:
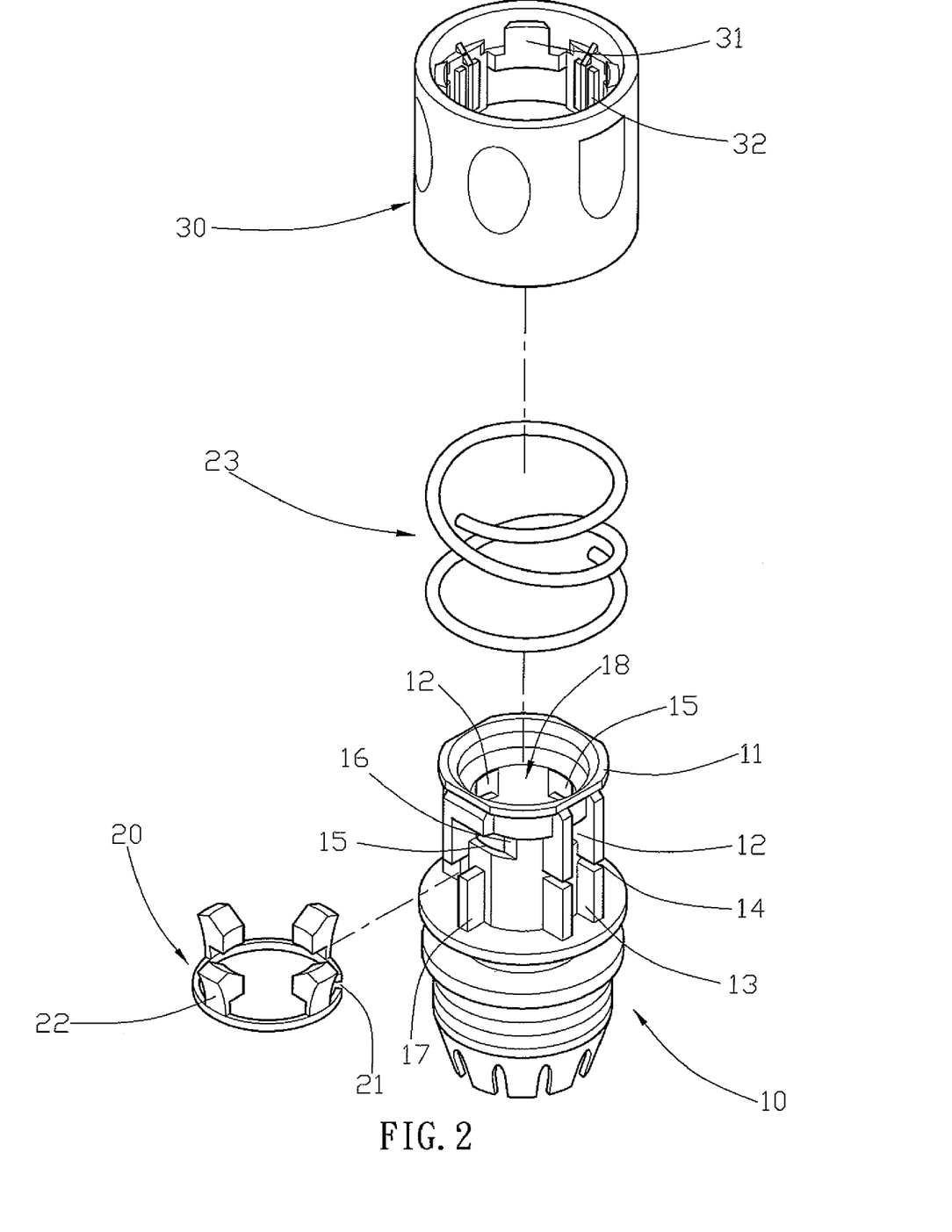
FIG. 2 is an exploded perspective view of the quick release connector as shown in FIG. 1.
Figure 3:
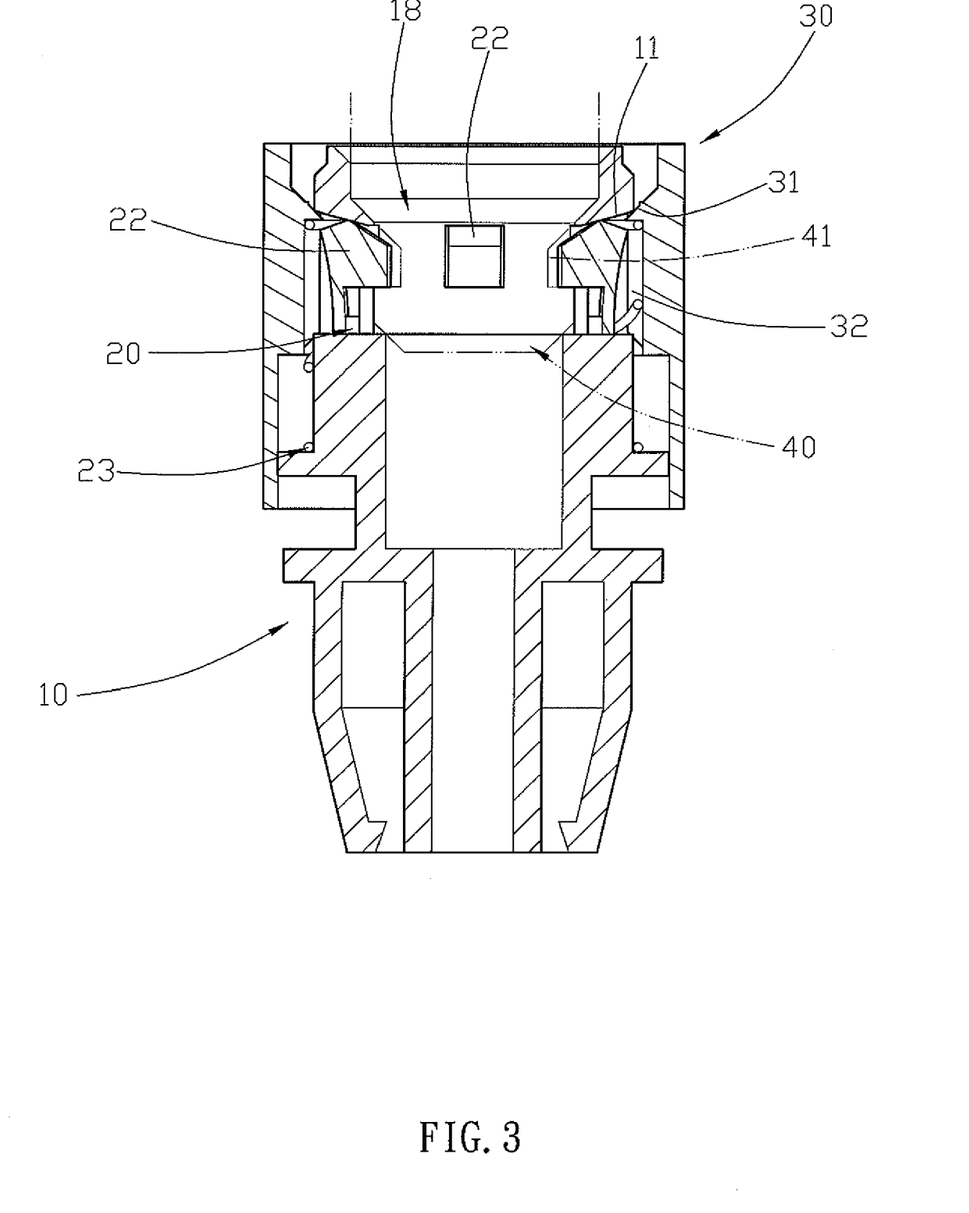
FIG. 3 is a front cross-sectional view of the quick release connector as shown in FIG. 1.

Referring to the drawings and initially to FIGS. 1-3, a quick release connector in accordance with the preferred embodiment of the present invention comprises a connector body 10 having an inside formed with a mounting chamber 18 and having a peripheral wall formed with two opposite receiving holes 12 connected to the mounting chamber 18 and two opposite guide slots 15 connected to the mounting chamber 18, a positioning ring 20 mounted on the peripheral wall of the connector body 10 and provided with a plurality of flexible locking blocks 22 movably mounted in the receiving holes 12 and the guide slots 15 of the connector body 10 and extendable into the mounting chamber 18 of the connector body 10, a mounting sleeve 30 movably mounted on the connector body 10 and having an inner wall provided with a plurality of inwardly extending push blocks 32 that are movable to press the locking blocks 22 of the positioning ring 20 to push the locking blocks 22 of the positioning ring 20 into the mounting chamber 18 of the connector body 10, and an elastic member 23 mounted on the connector body 10 and biased between the connector body 10 and the mounting sleeve 30 to push the mounting sleeve 30 outwardly relative to the connector body 10 and to push the push blocks 32 of the mounting sleeve 30 to press the locking blocks 22 of the positioning ring 20.

The connector body 10 has an end portion provided with a protruding limit flange 11 located beside the receiving holes 12 and the guide slots 15. The receiving holes 12 and the guide slots 15 of the connector body 10 are arranged in a staggered manner. The receiving holes 12 of the connector body 10 are perpendicular to the guide slots 15 of the connector body 10.

Each of the receiving holes 12 of the connector body 10 is provided with two outwardly extending catch walls 13 each formed with a positioning groove 14 to retain the positioning ring 20. Each of the catch walls 13 of each of the receiving holes 12 extends in an axial direction of the connector body 10, and the positioning groove 14 of each of the catch walls 13 of each of the receiving holes 12 extends in a transverse direction of the connector body 10.

Each of the guide slots 15 of the connector body 10 extends in the transverse direction of the connector body 10 and has a side formed with an oblique guide edge 16.

The peripheral wall of the connector body 10 is provided with two opposite support plates 17 aligning with a respective guide slot 15 of the connector body 10 to support the positioning ring 20. The support plates 17 of the connector body 10 and the catch walls 13 of the receiving holes 12 are arranged in a staggered manner. Each of the support plates 17 of the connector body 10 extends in the axial direction of the connector body 10 and is located at a middle position of the respective guide slot 15 of the connector body 10. Each of the support plates 17 of the connector body 10 and the positioning groove 14 of each of the catch walls 13 of each of the receiving holes 12 are located at the same height.

The positioning ring 20 is substantially C-shaped and has a side formed with a slit 21 so that the positioning ring 20 is made flexible and is mounted on the connector body 10 from the slit 21. The slit 21 of the positioning ring 20 is separated from and located between two of the locking blocks 22. Each of the locking blocks 22 is integrally formed on a periphery of the positioning ring 20. The locking blocks 22 of the positioning ring 20 align with the receiving holes 12 and the guide slots 15 of the connector body 10 respectively.

The inner wall of the mounting sleeve 30 is provided with a plurality of inwardly extending limit plates 31 that are movable to rest on the limit flange 11 of the connector body 10 to prevent the mounting sleeve 30 from being detached from the connector body 10. The push blocks 32 of the mounting sleeve 30 align with the blocks 22 of the positioning ring 20 respectively.

As shown in FIG. 3, the elastic member 23 is biased between the connector body 10 and the mounting sleeve 30 to push the mounting sleeve 30 outwardly relative to the connector body 10 and to push the push blocks 32 of the mounting sleeve 30 to press the locking blocks 22 of the positioning ring 20.

Figure 4:
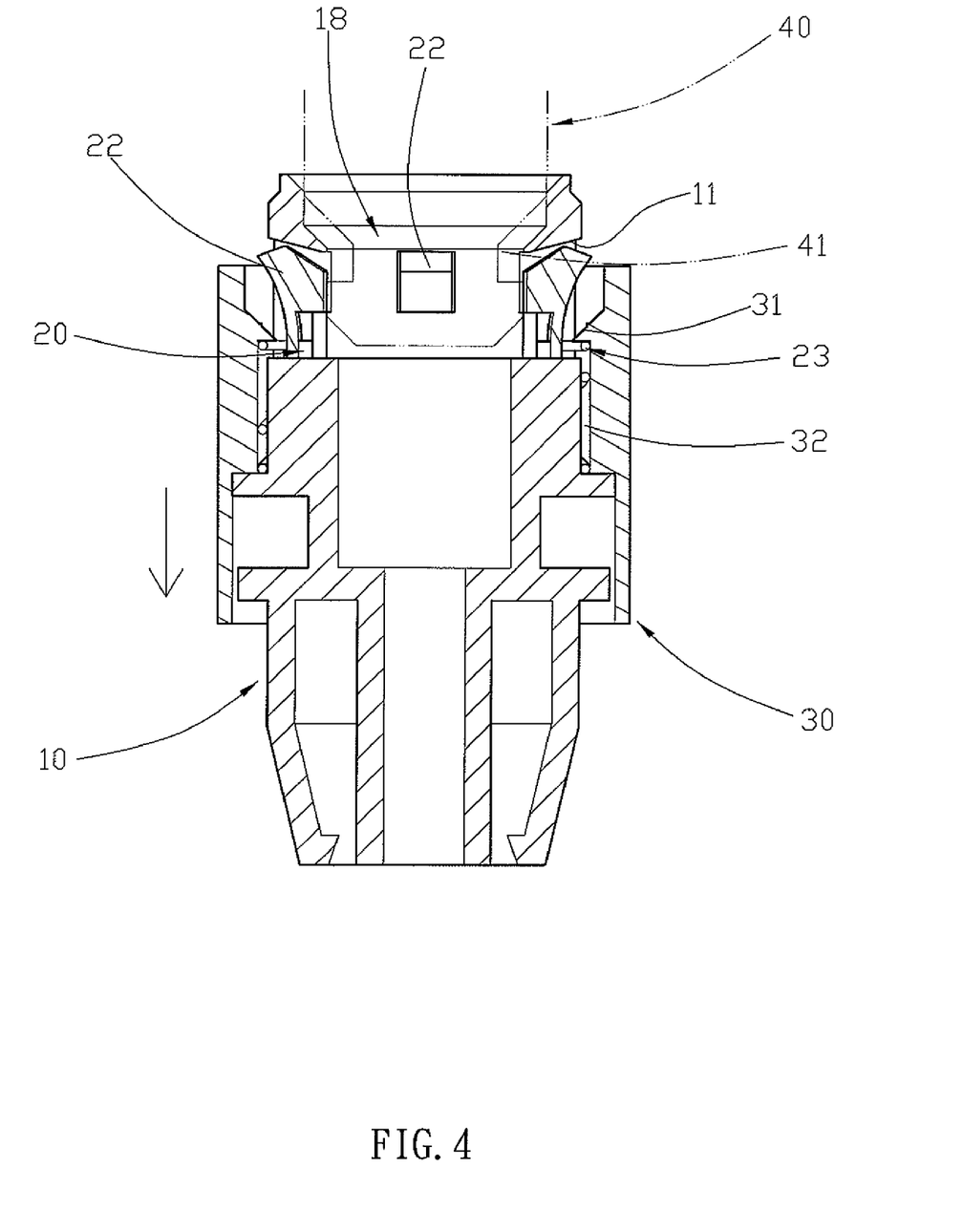
FIG. 4 is a schematic operational view of the quick release connector as shown in FIG. 3.

As shown in FIG. 4, when the mounting sleeve 30 is pressed toward the connector body 10, the elastic member 23 is compressed, and the push blocks 32 of the mounting sleeve 30 is movable to detach from the locking blocks 22 of the positioning ring 20, so that the locking blocks 22 of the positioning ring 20 are movable in the receiving holes 12 and the guide slots 15 of the connector body 10. Thus, when an insert 40 is inserted into the mounting chamber 18 of the connector body 10, the locking blocks 22 of the positioning ring 20 are extendable into an annular retaining groove 41 of the insert 40.

After the mounting sleeve 30 is released, the mounting sleeve 30 is pushed outwardly relative to the connector body 10 by the restoring force of the elastic member 23 so that the push blocks 32 of the mounting sleeve 30 are movable to press the locking blocks 22 of the positioning ring 20 into the retaining groove 41 of the insert 40 as shown in FIG. 3, so that the insert 40 is locked onto the connector body 10 by the locking blocks 22 of the positioning ring 20.

Figure 5:
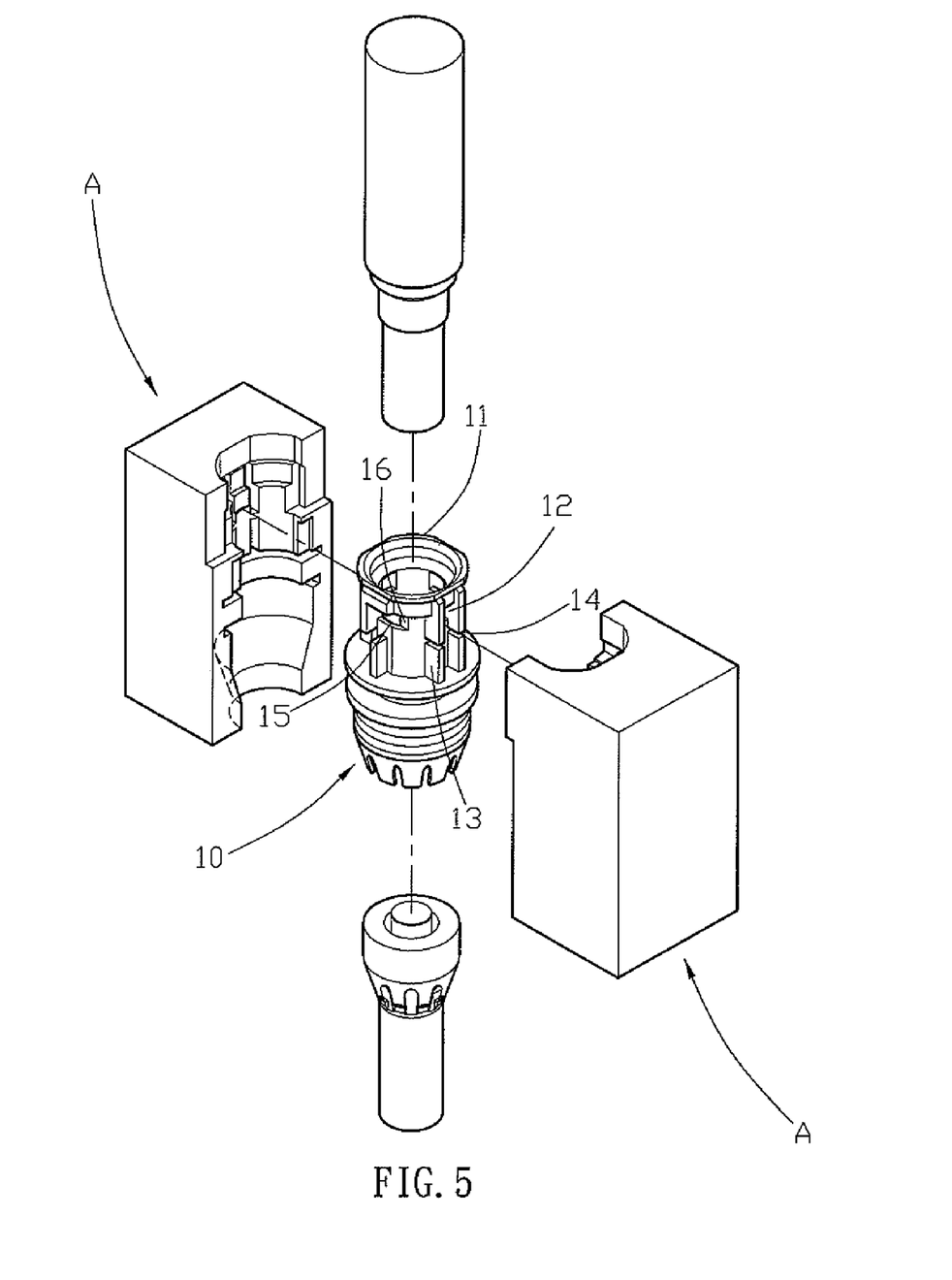
FIG. 5 is an exploded perspective view showing forming of the connector body of the quick release connector as shown in FIG. 2.

As shown in FIG. 5, the catch walls 13 of the receiving holes 12 of the connector body 10 are formed by slides "A" in a die during the molding process. At this time, the catch walls 13 of the receiving holes 12 are formed on two opposite sides of the peripheral wall of the connector body 10, so that the connector body 10 only needs two slides "A" to form the catch walls 13 so as to reduce the number of the slides "A". In addition, each of the guide slots 15 of the connector body 10 has a side formed with an oblique guide edge 16 to facilitate removal of the connector body 10 from the die.

Accordingly, the locking blocks 22 are combined together by limit of the positioning ring 20, so that the locking blocks 22 of the positioning ring 20 are placed into the receiving holes 12 and the guide slots 15 of the connector body 10 easily and quickly, thereby simplifying the construction of the quick release connector, and thereby facilitating assembly and fabrication of the quick release connector. In addition, the catch walls 13 are formed on two opposite sides of the connector body 10, and each of the guide slots 15 of the connector body 10 has a side formed with an oblique guide edge 16 to facilitate removal of the connector body 10 from the die, so that the number of the slides "A" is decreased, thereby facilitating design of the die, and thereby decreasing the costs of fabrication for the die. Further, the connector body 10 is only provided with two pairs of catch walls 13 so that the connector body 10 needs a relatively smaller die removal space in the die, and the die can form more connector bodies 10 at a time, thereby enhancing the working efficiency, and thereby decreasing the costs of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A quick release connector, comprising:
   a connector body having an inside formed with a mounting chamber and having a peripheral wall formed with two opposite receiving holes connected to the mounting chamber and two opposite guide slots connected to the mounting chamber;
   a positioning ring mounted on the peripheral wall of the connector body and provided with a plurality of flexible locking blocks movably mounted in the receiving holes and the guide slots of the connector body and extendable into the mounting chamber of the connector body;
   a mounting sleeve movably mounted on the connector body and having an inner wall provided with a plurality of inwardly extending push blocks that are movable to press the locking blocks of the positioning ring to push the locking blocks of the positioning ring into the mounting chamber of the connector body;
   an elastic member mounted on the connector body and biased between the connector body and the mounting sleeve to push the mounting sleeve outwardly relative to the connector body and to push the push blocks of the mounting sleeve to press the locking blocks of the positioning ring;
   wherein each of the receiving holes of the connector body is provided with two outwardly extending catch walls each formed with a positioning groove to retain the positioning ring.

2. The quick release connector in accordance with claim 1, wherein the receiving holes and the guide slots of the connector body are arranged in a staggered manner.

3. The quick release connector in accordance with claim 1, wherein the receiving holes of the connector body are perpendicular to the guide slots of the connector body.

4. The quick release connector in accordance with claim 1, wherein the catch walls of the receiving holes are formed on two opposite sides of the peripheral wall of the connector body.

5. The quick release connector in accordance with claim 1, wherein each of the guide slots of the connector body extends in a transverse direction of the connector body.

6. The quick release connector in accordance with claim 1, wherein each of the guide slots of the connector body has a side formed with an oblique guide edge.

7. The quick release connector in accordance with claim 1, wherein the positioning ring is substantially C-shaped.

8. The quick release connector in accordance with claim 1, wherein the locking blocks of the positioning ring align with the receiving holes and the guide slots of the connector body respectively.

9. The quick release connector in accordance with claim 1, wherein the push blocks of the mounting sleeve align with the blocks of the positioning ring respectively.

10. The quick release connector in accordance with claim 1, wherein:
    each of the locking blocks is integrally formed on a periphery of the positioning ring;
    the locking blocks are combined together by limit of the positioning ring.

11. The quick release connector in accordance with claim 1, wherein each of the catch walls of each of the receiving holes extends in an axial direction of the connector body.

12. The quick release connector in accordance with claim 11, wherein positioning groove of each of the catch walls of each of the receiving holes extends in a transverse direction of the connector body.

13. The quick release connector in accordance with claim 1, wherein the positioning ring has a side formed with a slit so that the positioning ring is made flexible and is mounted on the connector body from the slit.

14. The quick release connector in accordance with claim 13, wherein the slit of the positioning ring is separated from and located between two of the locking blocks.

15. The quick release connector in accordance with claim 1, wherein the peripheral wall of the connector body is provided with two opposite support plates aligning with a respective guide slot of the connector body to support the positioning ring.

16. The quick release connector in accordance with claim 15, wherein the support plates of the connector body and the catch walls of the receiving holes are arranged in a staggered manner.

17. The quick release connector in accordance with claim 15, wherein each of the support plates of the connector body extends in an axial direction of the connector body.

18. The quick release connector in accordance with claim 15, wherein each of the support plates of the connector body is located at a middle position of the respective guide slot of the connector body.

19. The quick release connector in accordance with claim 15, wherein each of the support plates of the connector body and the positioning groove of each of the catch walls of each of the receiving holes are located at the same height.

* * * * *